Nov. 25, 1969

J. Z. DENINSON ET AL 3,480,352

SCANNING ASSEMBLY FOR PRODUCING ANIMATED IMAGES

Filed Dec. 12, 1966

INVENTORS
JACOB Z. DENINSON
JOSEPH H. DENINSON
BY
Edward F. Levy
ATTORNEY

Nov. 25, 1969  J. Z. DENINSON ET AL  3,480,352

SCANNING ASSEMBLY FOR PRODUCING ANIMATED IMAGES

Filed Dec. 12, 1966  2 Sheets-Sheet 2

INVENTORS
JACOB Z. DENINSON
JOSEPH H. DENINSON
BY
Edward F. Levy
ATTORNEY

United States Patent Office 3,480,352
Patented Nov. 25, 1969

3,480,352
SCANNING ASSEMBLY FOR PRODUCING
ANIMATED IMAGES
Jacob Z. Deninson and Joseph H. Deninson, both of
21 W. 86th St., New York, N.Y. 10024
Filed Dec. 12, 1966, Ser. No. 600,819
Int. Cl. G03b 41/00, 35/00, 21/00
U.S. Cl. 352—81                                10 Claims

ABSTRACT OF THE DISCLOSURE

A scanning assembly wherein successive pictures in a motion sequence are reduced transversely, divided into a series of spaced strips and reproduced on a carrier in the form of a band extending parallel along one edge of the carrier, and a scanner composed of a row of multiple cylinders is caused to traverse the band on the carrier in such a manner as to assemble optically the pictures represented by the series of strips in such vision-retention succession to produce an animated image.

---

In U.S. Patent No. 2,214,013, issued September 10, 1940, to Jacob Z. Deninson, there is shown an optical scanning device composed of a row of parallel transparent cylinders used to assemble and produce an image from visual elements constituting divided, spaced, and reduced portions of the image to be reproduced. By alternating several series of these elements on a carrier, the scanning device could be moved transversely along the carrier to produce different images.

It has been found that if the series of picture elements represents a succession of pictures in a movement sequence, for example the reproductions of consecutive frames of a motion picture film, the proper movement of the scanning device along these elements will produce an animated image similar to a motion picture. It has also been found desirable to reproduce the elements on a sheet of paper such as the page of a book, so that a scanning device can be employed to produce a moving image illustrating the written matter in the book. Neither the scanning device nor the arrangement of picture elements disclosed in the aforesaid patent were suitable for this purpose.

It is an object of the present invention, therefore, to provide a scanning assembly wherein visual picture elements are so arranged upon a carrier such as a sheet of paper that when a scanner made in accordance with the invention traverses the picture elements, a succession of animated visual images is produced upon the scanner in a sequence limited only by the size of the carrier.

Another object of the invention is the provision of a scanning assembly of the character described which may be applied to a book, an instruction sheet, or the like, so that the material therein may be illustrated in visual animated form.

As contemplated by the present invention, a succession of sequential motion pictures are reduced in width and divided into a plurality of sections reproduced on a carrier in the form of elongated narrow strips. The strips of each picture are spaced from each other and are oriented with their longitudinal axes inclined to one edge of the carrier. The strips of individual pictures in the sequence are arranged in staggered abutment with the strips of the adjacent pictures in such a manner that corresponding strips of all of the pictures are arranged in longitudinal columns and together forming a band of strips extending parallel to said edge of the carrier. A scanning device is provided, including a plurality of transparent optical cylinders corresponding to the number of divided picture sections, and having means for producing a relative movement between said scanning device and said carrier such that the scanning device traverses said band in a direction along the longitudinal axis of the band, and a series of assembled and enlarged animated images are produced on the face of the scanning device.

Additional objects and advantages of the invention will be apparent during the course of the following specification when taken in connection with the accompanying drawings, in which:

FIG. 1 is a plan view of a picture reduced in width for the purpose of providing divided picture sections in accordance with the invention;

FIG. 2 is a plan view of a carrier upon which has been reproduced three divided sections of the picture shown in FIG. 1;

FIG. 3 is a top plan view of a scanning device made in accordance with the present invention, and shown applied to and overlying the carrier of FIG. 2 in such a manner as to provide as to provide an assembled and enlarged image from the three picture sections on the carrier;

FIG. 4 is a section taken along line 4—4 of FIG. 3;

FIG. 5 is a top plan view of a carrier having a band of successive printed strips arranged thereon in accordance with the present invention, and showing applied thereto a scanning device also made in accordance with the invention;

Figure 6:
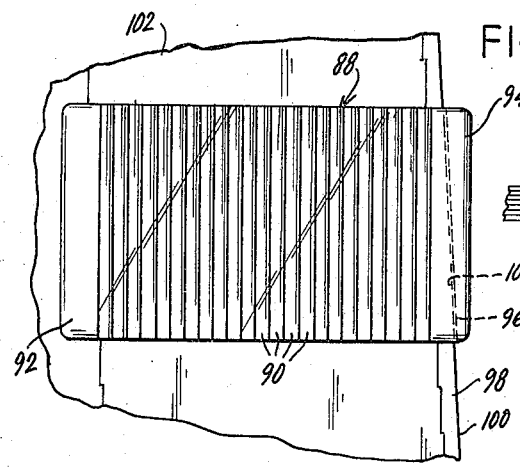
FIG. 6 is a top plan view of a modified form of scanning device shown applied to a portion of a carrier.

In accordance with the invention, a series of successive pictures are utilized to produce an animated effect. In the example illustrated herein, the reproduction 20 represents one of a series of successive drawings of a man running. Each of these is reduced and divided into strips in the manner explained. If the series of strips is successively scanned at the proper rate, the succession of images produce the animated effect of a man running. As another example, instead of reproducing drawings, the succession of strips may be made of photographs constituting reproductions of successive frames of a motion picture film, each reduced transversely and divided in the same manner.

In practicing the invention herein to produce an animated succession of images from figures printed or reproduced on a paper or other carrier, there is employed a scanning device of the type described and shown in the aforesaid U.S. Patent No. 2,214,013. A short description of the scanning device is included herein for a complete understanding of the invention.

FIGS. 3 and 4 illustrate a scanning device 10 composed of a row of optical cylinders 12, 14 and 16 arranged parallel to each other and laterally aligned. The cylinders are preferably made of transparent plastic having the desired optical properties, or may be made of glass or other suitable transparent and refracting material. The cylinders may be formed as separate rods and secured together in side-by-side abutting relationship within the scanning device, or they may be molded integrally in the manner shown in FIG. 4. For purposes of simplifying the explanation of the operation of the invention, the scanner 10 is shown as comprising three transparent cylinders, although in its commercial form the scanner is preferably composed of a greater number of cylinders as will be presently described.

The scanning device 10 is constructed to reproduce a complete, contiguous image of a picture or the like from divided and reduced sections of the picture applied to a carrier. FIGS. 1 and 2 illustrate the manner in which these picture sections are formed. In FIG. 1 there is shown a carrier, such a strip of paper 18 bearing a reduced reproduction 20 of a drawing. The reproduction 20 may be made by photographing the original drawing through a suitable lens in such a manner that the height of the original drawing remains constant but its width is uniformly reduced. In the example shown, for use with the scanning device 10, the width of the reproduction 20 has been reduced to one-fifth of that of the original.

In order to be scanned by the three-element device 10, the reduced drawing 20 is divided into three equal longitudinal sections marked A, B and C along lines 22, and 24. These sections A, B and C are then reproduced in the form of spaced picture strips 26, 28 and 30 in the spaced parallel relationship shown in FIG. 2, upon a carrier 32 such as a paper sheet or strip. The reproduction of the picture strips upon the carrier 32 may be accomplished by printing, photography, or other suitable means.

Each picture strip 26, 28, 30 bears one-third composite, reduced picture, designated A, B, and C respectively, and each has a central longitudinal axis 34, 36 and 38, these axes being spaced apart by a distance equal to five times the width of each strip 26. This spacing corresponds to the amount by which the width of the reduced strips must be laterally expanded to recreate the original picture, namely, five times.

The length of each of the cylinders 12, 14 and 16 of the scanning device 10 is equal to the height of the picture strips 26, 28, 30 and each cylinder is capable of magnifying a picture strip, in a transverse direction only, to the scale of the original picture. That is to say, where, as in the illustrated embodiment, the picture strips are reduced to ⅕ their original size, the cylinders are selected to enlarge the strips transversely five times, so as to produce an image of the same width as the original drawing from which the reduced reproduction 20 was made. Each cylinder corresponds optically to a thick lens and has an external focal point shown respectively at 40, 42 and 44 in FIG. 4. The scanning zone of each cylinder is represented by lines 46, 48 in FIG. 4, these zones having an apex at the respective focal points. The longitudinal axes 50, 52, 54 of cylinders 12, 14 and 16 also intersect the respective focal points 40, 42 and 44.

The aforesaid panel spacing and size of cylinders is such that when the scanning device 10 is applied flat upon the carrier 32, with the cylinders 12, 14 and 16 each resting flush against the printed surface of carrier 32, the scanning device 10 may be oriented in such a position that the longitudinal axes 50, 52 and 54 of the cylinders 12, 14 and 16 are in registry with the longitudinal axes 34, 36 and 38 of the respective picture strips 26, 28 and 30. This condition is shown in FIG. 4, wherein the reduced picture A, B and C of each picture strip 26, 28 and 30 on carrier 32 is enlarged transversely by a respective cylinder 12, 14 and 16 to produce an enlarged image A$a$, B$a$, and C$a$. As shown in FIG. 3, the enlarged image sections A$a$, B$a$ and C$a$ are contiguous along the surface of the adjacent cylinders to produce an assembled image 56 of the same proportion as the original picture from which the reduced reproduction 20 was made.

If the scanning device 10 is now shifted along a line perpendicular to the strip axes 34, 36 and 38, the assembled optical image 56 will quickly disappear.

In FIG. 2, three further picture strips 58, 60 and 62 are shown in phantom in the position in which they would be arranged with the strips 26, 28 and 30. These strips 58, 60 and 62 bear the markings $A_1$, $B_1$, and $C_1$ to indicate reduced sections of a drawing similar to A, B and C, but representing the next stage in the walking movement. The strips 58, 60 and 62 are printed or otherwise reproduced on carrier 32 in transverse alignment abutting one side of the strips 26, 28 and 30, but longitudinally staggered therewith, as shown. The next series of strips in the animated sequence will be arranged adjacent the strips 58, 60 and 62 in a similar manner, as shown in FIG. 5 and as will be explained. In order to successively scan the two series of strips shown in FIG. 2, the scanner device 10 must be moved out of registry with the strips 26, 28 and 30 in a downward angular direction until the longitudinal axes of the scanner cylinders are in registry with the respective longitudinal axes of the strips 58, 60 and 62 and the cylinders are aligned with the tops and bottoms of said latter strips.

FIG. 5 shows the manner in which a series of divided picture strips, of the type just described, are arranged on a carrier 64 which may be a sheet of paper such as the page of a book having a straight marginal side edge 66. The strips are arranged in the form of a wide band 68 extending parallel and proximate to the edge 66. Within the band 68, successive sets of three picture strips are arranged in the adjacent staggered relationship explained in connection with FIG. 2, except that the strips themselves are disposed angularly to the edge 66 of carrier 64.

In FIG. 5, a scanner device 10 is shown in the course of scanning the band 68 of strips. The three optical cylinders 12, 14 and 16 of the scanner 10 are in registry with three respective strips 26, 28, and 30, which, as shown in FIG. 2, bear the divided and reduced picture sections A, B and C, and are marked as such. Directly adjacent the strips 26, 28 and 30 and longitudinally offset therefrom are the three strips 58, 60 and 62 bearing reduced sections $A_1$, $B_1$ and $C_1$ of the next picture in the sequence. These are followed by three adjacent and offset strips marked $A_2$, $B_2$ and $C_2$ to indicate the sections of the next picture in the sequence, which are in turn followed by strips $A_3$, $B_3$, and $C_3$ representing the next consecutive picture etc.

The individual picture strips within the band 68 are aligned with their longitudinal axes forming angles of approximately 25° with the carrier edge 66. It will be observed that the strips in the A series, that is those strips representing the sequence of the left-hand sections of the pictures, are vertically aligned with their centers falling along line 70 which is parallel to the edge 66. Similarly, the centers of the strips on the B series, representing the center picture sections, are aligned along line 72, and the centers of the C series strips, representing the right-hand picture sections, are aligned along line 74. Thus, within the band 68, the strips are longitudinally aligned in columns of three each, for example, the column 76, shown in FIG. 5, consists of the strips C, $B_5$ and $A_{10}$. In each of these columns, the top of one strip abuts the bottom of the preceding strip.

Within the band 68, the picture strips of each set are also aligned in inclined rows. For example, the strips $A_6$, $B_6$ and $C_6$, representing the divided sections of a single picture in the sequence, are aligned in an inclined row indicated by the arrow 78 and oriented in the direction of said arrow. In this row, the strip $A_6$ is separated from the strip $B_6$ by four transversely-abutting columns of strips, including column 76, and the strip $B_6$ is similarly spaced from strip $C_6$ by four columns of strips.

The three cylinders 12, 14, and 16 of the scanner device 10 are shown in FIG. 5 encased within and bordered by a rectangular frame 80 which is made of a suitable rigid material such as metal or plastic and is preferably opaque to delineate the image to be viewed on the scanner. The frame 80 is provided with a flange 82 depending from the bottom surface thereof and disposed at an angle to the longitudinal axis of said frame. The flange 82 is sized to rest flush against and to slide along the edge 66 of carrier 64, and is arranged at such an angle as to maintain the scanning cylinders 12, 14 and 16 parallel to the respective picture strips A, B and C, as well as the other strips constituting the band 68. The flange 82 also maintains the cylinders 12, 14 and 16 with their centers in registry with the respective lines 70, 72 and 74.

FIG. 5 shows the three scanner cylinders in axial alignment with the strips A, B and C, so as to reproduce the enlarged composite image $Aa$, $Ba$, $Ca$ as shown in FIG. 3. The scanner device 10 may now be moved downwardly in the direction of arrow 84, parallel to the carrier edge 66. The scanner cylinders thus move out of alignment with strips A, B and C and into axial alignment with the strips $A_1$, $B_1$ and $C_1$ to produce an image of the next picture in the sequence. As the scanner device is moved down to the bottom of the band 68, a succession of consecutive images are produced, resulting in a motion picture effect, since the eye will retain a vision of each image momentarily, while the scanner moves to the next series of strips. The scanner can be moved slowly, for example, at the rate of two or three strips per second, in order to obtain the necessary retention of vision to create movement in the image.

The strips of the different series are staggered and inclined to the manner shown in order to provide a continuous sequence of images without repetition. It will be understood that if the successive series of strips were arranged parallel to each other in a single row, the strips would have to be arranged in groups of five, representing a short sequence, followed by another short sequence, etc. In addition, the scanning device would be drawn transversely along the row so that each strip would be scanned by all three cylinders, producing a repetition of image sections, or an image composed of scrambled sections in improper sequence. With the arrangement of the band 62 shown in FIG. 5, the cylinder 12, for example, moves transversely as well as longitudinally of the strips therebeneath, so that after leaving its position of registry with strip A, shown in full line in FIG. 5, it moves to the position indicated by the broken lines $12a$, in registry with strip $A_1$, and then directly into the position indicated by broken lines $12b$, in registry with strip $A_2$. Each strip is thus successively scanned without repetition, since the cylinders 14 and 16 can never come into registry with the strips of the A series.

Figure 7:
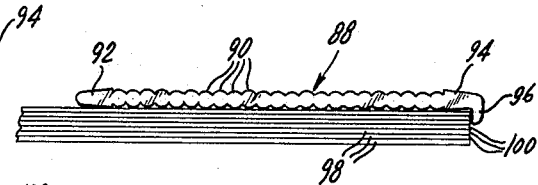
FIG. 7 is an end elevational view of the scanning device and carrier in the same relationship as shown in FIG. 6.

While for the sake of simplicity, the invention has thus far been illustrated in the form of three scanning cylinders acting in conjunction with three divided picture strips, in its commercial form the scanning system would employ a considerably larger group of scanning cylinders ad a corresponding number of divided picture strips. FIGS. 6 and 7 illustrate such a scanning device 88 composed of twenty-three cylinders 90 which are molded integrally of plastic, together with flat end portions 92, 94 and a depending guide flange 96.

The scanning device 88 is shown associated with a carrier in the nature of one of the pages 98 of a book. As shown in FIG. 6, the uppermost page 98 has an edge 100, and a band 102 of picture strips (shown schematically) is printed on said page 98 proximate to and parallel with the edge 100. The band 102 is composed of spaced picture strips arranged according to the manner previously described, except that in this case, each picture is divided into twenty-three narrow strips, corresponding to the number of cylinders 90. In addition, both the cylinders 90 and the picture strips are, in this instance, inclined at a lesser angle relative to the page edge 100, than in the previous embodiment.

FIG. 7 shows the manner in which the flange 96 engages the edges 100 of the underlying book pages 98 to guide the scanning device 88 during the scanning operation. The device operates in the same manner as previously described, a sequence of successive, transversely-enlarged images appearing on the surfaces of the cylinders 90 as the scanner is moved along the band 102.

Figure 8:
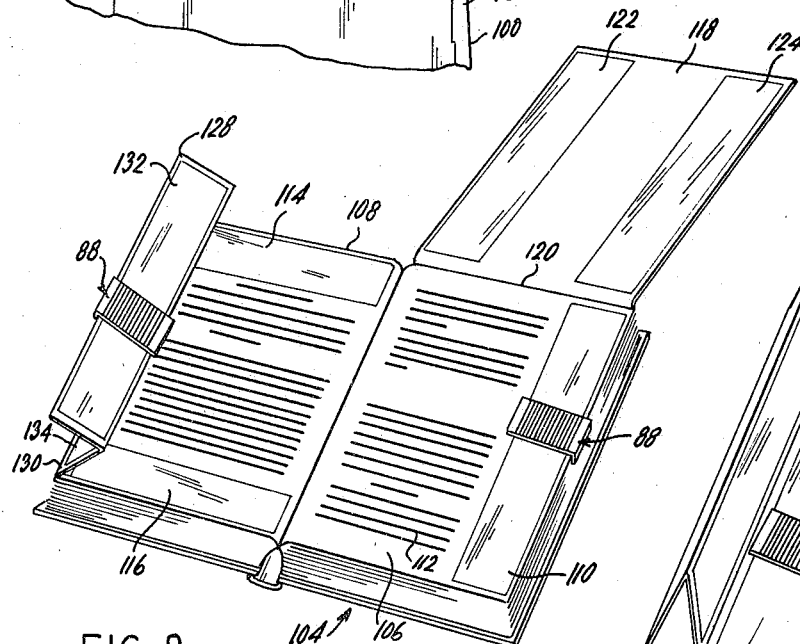
FIG. 8 is a perspective view of an open book showing the manner in which bands of picture strips may be reproduced on the pages thereof, and also showing the manner in which the scanning devices of FIGS. 6 and 7 may be applied to the strip bands.

The animated scanning arrangement of the invention is primarily intended to be employed in conjunction with books, pamphlets, circulars and the like, to produce animated illustrations in conjunction with the printed matter. As one example, the arrangement can be advantageously employed to provide a motion picture sequence for an instruction sheet or book. For this purpose, where the instructions involve a number of different operations, it is desirable to include as many different sequences as possible. FIG. 8 illustrates several manners in which this may be done in the case of a book 104 having right-hand pages 106 and left-hand pages 108. The uppermost right-hand page 106 has a band 110 of picture strips arranged along the side edge thereof in association with the printed matter 112. The scanning device 88 of FIGS. 6 and 7 is shown applied to the band 110. The uppermost left-hand page 108 shows the manner in which bands 114 and 116 may be printed horizontally along the top and bottom edges of the page, with the picture strips in said bands being arranged to be traversed by the scanning device as it is moved horizontally along said edges.

The page 106 in FIG. 8 is shown as having a fold-out in the nature of a separate, unbound page 118 joined to page 106 along a folded edge 120. Along the side edges of the fold-out page 118 are respective bands of strips 122 and 124, which may be traversed by the scanner device, and another pair of bands may be similarly arranged on the opposite side of page 118.

The page 108 has an alternate type of fold-out in the nature of a relatively narrow sheet attached to the page 106 along its side edge and folded to form two elongated panels 128 and 130. These panels are just wide enough to carry a band of picture strips. A band 132 is shown printed on the outer face of panel 128, and a similar band may be printed on the opposite surface. The panel 130 carries the band 134, and again a similar band may be printed on the reverse face. A scanning device 88 is shown overlying the band 132 and in position to traverse said band, guided by the free side edge of the panel 128. It will be appreciated that by selective folding of the sheet 126, scanner-guiding edges can be provided for all four of the bands printed thereon.

Figure 9:
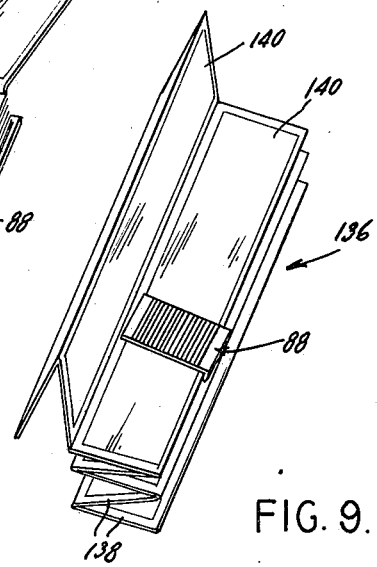
FIG. 9 is a perspective view of a folder having picture strip bands reproduced on the panels thereof, and with a scanning device shown applied to one of the bands.

FIG. 9 shows a brochure-type piece in the form of a paper sheet 136 folded to provide a relatively large number of panels 138, each carrying a printed band 140 of picture strips on its opposite faces. Each band 140 may be traversed by the scanning device 88 in the manner previously described by guiding the device along the folded edge of the panel bearing the selected band.

Figure 10:
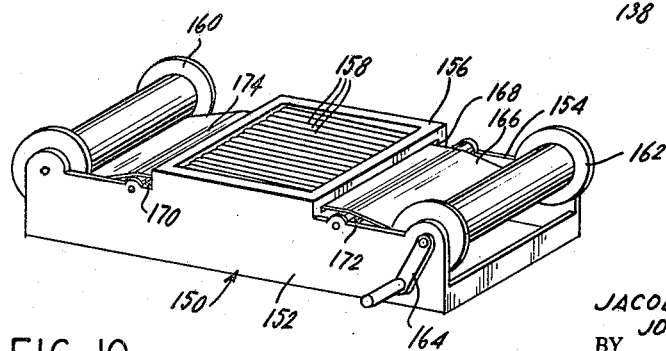
FIG. 10 is a perspective view of a modified form of scanning assembly made in accordance with the present invention.

FIG. 10 illustrates an alternate embodiment of the invention wherein, instead of moving the scanning device along a stationary carrier, the carrier is moved along a stationary scanning device. The assembly shown in this view comprises a body member 150 having upstanding side walls 152, 154 bridged at their center by a frame 156 in which a scanning device formed of cylinders 158 is mounted. At their ends, the walls 152, 156 rotatably mount a pair of spools 160 and 162. A crank 164 is provided for rotating the spool 162.

A carrier, which may be in the form of a long paper tape, is initially rolled up upon the feed spool 160. The carrier 166 is then threaded through slots 168 in the frame 156 and attached to the take-up spool 162. The carrier 166 passes over guide rollers 170 and 172 located at opposite ends of frame 156, said rollers maintaining the face of the carrier in flush abutment with the under surfaces of cylinders 158. The guide rollers 170, 172 and the frame 156 are located on a slightly higher level than the spools 160, 162, as shown, in order to maintain some tension upon the carrier 166.

When the crank 164 is rotated in the proper direction, the carrier 166 is drawn from feed spool 160 and wound up on take-up spool 162. As this occurs, the carrier is moved beneath the scanning cylinders 158. The carrier 166 bears a continuous band 174 of divided picture strips arranged in sequence as previously described, so that a succession of images will appear on the surface of cylinders 158 to produce an animated effect. In this instance, the carrier 166 may be made of a transparent material and a lamp (not shown) provided within the body 150 beneath the frame 156 to illuminate the images produced on the scanning device.

It is to be understood that the picture sections may be reproduced on the carrier in black and white or in natural color for use with colorless transparent optical cylinders. Alternatively, the optical cylinders may be tinted to a selected color and used with picture sections of a uniform but different color to produce an image of a shade constituting a mixture of the two colors.

While illustrative embodiments of the invention have been shown and described herein, it is obvious that numerous omissions, changes and additions may be made in such embodiments without departing from the spirit and scope of the invention.

What is claimed is:

1. A scanning assembly employing a scanning device including a plurality of transparent cylinders mounted in parallel abutting relationship to scan a like number of divided and spaced picture sections underlying said cylinders and in axial alignment therewith to produce an enlarged, assembled visual image of said sections on the face of said scanning device, wherein the improvement comprises a carrier having a straight edge, a band composed of a series of interfitting picture sections reproduced on said carrier, said band having a longitudinal axis extending parallel to said edge, the picture sections of said band comprising a succession of divided pictures in consecutive animated sequence, with the divided sections of each picture being spaced from each other by a distance equal to the distance between the central longitudinal axes of said cylinders, and all of said picture sections in said band being parallel to each other and arranged at an inclined angle to said longitudinal axis of said band, and guide means for maintaining said scanning device with the cylinders thereof disposed at said inclined angle to the longitudinal axis of said band and parallel to said picture sections, and for providing relative movement between said scanning device and said carrier in a direction parallel to the longitudinal axis of said band, whereby each cylinder traverses succesively one section of each picture in the sequence and said cylinders cooperate to reproduce enlarged images in animated succession on the face of said scanning member for direct view by an observer.

2. A scanning assembly according to claim 1 in which each of said picture sections comprises an elongated narrow strip bearing a picture section reduced transversely by an amount equal to the degree of transverse magnification of each of said cylinders.

3. A scanning assembly according to claim 2 in which the divided sections of one picture are longitudinally offset from the corresponding sections of the succeeding picture in said band.

4. A scanning assembly according to claim 3 in which the divided sections of one picture each having a longitudinal edge in transverse registry with a longitudinal edge of the corresponding section of the succeeding picture in said band.

5. A scanning assembly according to claim 4 in which corresponding sections of each of the successive pictures in said band are aligned with their centers on a common axis parallel to said carrier edge.

6. A scanning assembly according to claim 1 in which said guide means comprises a body member including a stationary frame mounting said scanning device, a feed spool and a take-up spool mounted on said body member on opposite sides of said frame, said carrier being wound on said feed spool and attached to said take-up spool, means for rotating said take-up spool in a direction to advance said carrier from said feed spool to said take-up spool, and means for guiding said carrier through said frame beneath said scanning device as said take-up spool is rotated, with the inclined picture strips thereon aligned with said cylinders, whereby consecutive pictures in said band are successively scanned by said scanning device.

7. A scanning assembly according to claim 1 in which said guide means comprises a depending flange on said scanning device remote from said cylinders and disposed at an angle to the axis of said cylinders equal to the angle between said inclined picture sections and the straight edge of said carrier.

8. A scanning assembly according to claim 7 in which said carrier comprises a paper sheet having a band of picture sections on one face thereof arranged parallel to and adjacent at least one edge thereof, said depending flange being adapted to abut said edge in sliding engagement therewith as said scanning device is held flush upon the face of said sheet overlying said band and is drawn longitudinally along said band.

9. A scanning assembly according to claim 8 in which said paper sheet comprises a page of a book, said page having an integral fold-out section bearing a plurality of picture section bands along the edges thereof.

10. A scanning assembly according to claim 8 in which said paper sheet is folded into elongated panels, each panel bearing a picture section band on its opposite faces with said bands arranged parallel to the folded edges of said sheet.

References Cited

UNITED STATES PATENTS

| | | |
|---|---|---|
| 1,150,374 | 8/1915 | Kanolt. |
| 2,214,013 | 9/1940 | Deninson _____ 352—105 |
| 2,398,257 | 4/1946 | Schwartz. |
| 2,943,533 | 7/1960 | Goodbar. |
| 3,082,560 | 3/1963 | Elvestrom. |

FOREIGN PATENTS 861,990   3/1961   Great Britain.

JULIA E. COINER, Primary Examiner

U.S. Cl. X.R.

40—65; 46—34; 283—63; 350—167; 352—58, 129, 232